UNITED STATES PATENT OFFICE.

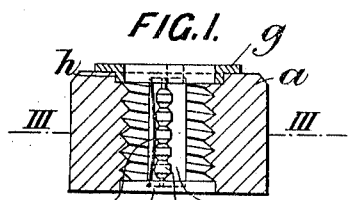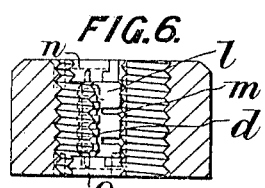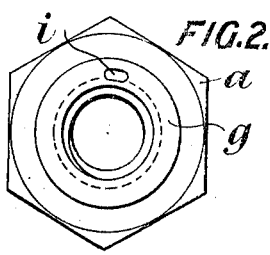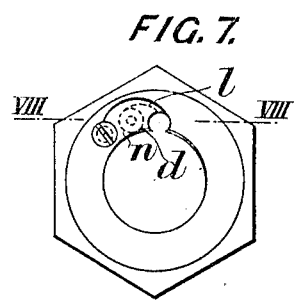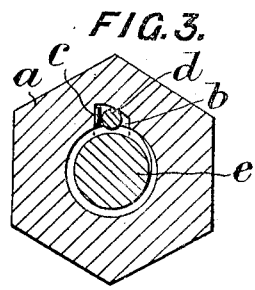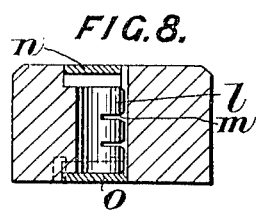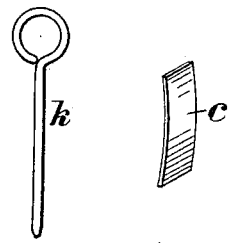

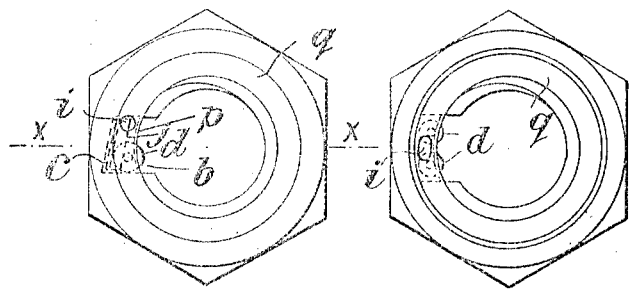

WILLIAM REES BEVAN, OF BELVEDERE, AND DANIEL THOMAS MORLEY, OF WELLING, ENGLAND.

NUT-LOCK.

1,040,609.
Specification of Letters Patent.
Patented Oct. 8, 1912.

Application filed July 31, 1909. Serial No. 510,601.

*To all whom it may concern:*

Be it known that we, WILLIAM REES BEVAN and DANIEL THOMAS MORLEY, both subjects of the King of Great Britain and Ireland, residing, respectively, at No. 13 Upper Holly Hill Road, Belvedere, in the county of Kent, England, and "Leumbrah," Dover Road, Welling, in the county of Kent, England, have invented new and useful Improvements in Nut-Locks, of which the following is a specification.

This invention relates to improvements in nut locks of the type having a slanting and tapering slot or slots, longitudinal of the internally screwed hole, and which is or are more or less tangential to the screw or bolt on which the nut is screwed and in which a preferably grooved roller or pawl in such slot or in each of such slots is adapted to engage between the screw and the tangential side of the slot so as to lock the screw and nut together.

Now according to this invention a spring is combined with a nut lock comprising a preferably grooved roller or pawl contained in a more or less curved and tapering tangential recess longitudinal of the bolt or screw, the spring being preferably arranged in such a manner as to be operative at about in the middle or at more than one point of the length of the roller for the purpose of tending to maintain the parallelism of the roller. The spring for operating on the roller is a bent leaf spring, and preferably it has a lateral projection or foot to prevent it from becoming displaced. The said roller may be pushed back by the insertion of a pin or lever in a more or less lateral hole in the nut or in a hole in the upper part of the nut. An inwardly projecting retaining cap, flange or surface or a suitable washer or perforated disk with a downwardly projecting lip or lug is provided at each end of the nut in order to prevent the displacement of the roller in the axial direction and to prevent it from falling out when the nut is removed from the screw. The perforated disk may be made somewhat curved in shape and the nut is provided with a recess having an undercut edge so that when the disk is in place and pressure applied it flattens and expands into the recess.

Figure 1 of the accompanying drawings illustrates in sectional elevation a nut constructed according to this invention adapted to be locked from turning in the direction to unscrew it. Fig. 2 is a plan thereof, and Fig. 3 a plan section on the line III—III Fig. 1. Fig. 4 is a detail view in perspective of a spring for causing the roller to be pushed into its operative position and Fig. 5 is a view of a pin or lever for disengaging the roller from the locking position. Fig. 6 is a sectional elevation of a modified form of nut lock. Fig. 7 is a plan thereof and Fig. 8 is a section on the line VIII—VIII, Fig. 7. Fig. 9 is a plan of another modification. Fig. 10 is a section of the nut on the line X—X Fig. 9. Fig. 11 is a perspective view of a perforated disk before it is fixed to the nut, and Fig. 12 is a sectional elevation of the perforated disk, and Fig. 12$^a$ is a perspective view of a modified form of spring. Fig. 13 is a plan of a nut similar to that shown in Fig. 9 but provided with two rollers in one slot so arranged as to lock the nut against screwing up or unscrewing, and Fig. 14 is a similar view with a perforated disk removed. Fig. 14$^A$ is a perspective view of another modified form of spring.

The construction shown in Figs. 1, 2, 3 and 4 shows a nut $a$ provided with a more or less tangential slot $b$ in which is loosely mounted the spring $c$ which bears against one side of the grooved roller $d$ and the latter is on its other side adapted to engage with the threads of the screw $e$ (only shown in Fig. 3). The ends of the grooved roller are reduced in diameter and they are held against longitudinal movement by means of a cap ledge or ring $f$ formed at the bottom of the nut and a cap or washer $g$ with a flange or ledge $h$ at the top. The upper disk $g$ is further provided with the hole $i$ (Fig. 2) to admit of the insertion of the pin or lever $k$ (Fig. 5) to force the roller $d$ out of engagement with the threads of the screw $e$ when the nut is to be released.

Figs. 6, 7 and 8 show a bent leaf spring $l$ with slots $m$, which spring serves the double purpose of a spring and bearing surface for the roller $d$ in the slot. Caps $n$ and $o$ are provided respectively at the top and bottom of the nut to prevent longitudinal movement of the spring $l$ and roller $d$.

Figs. 9, 10, 11 and 12 serve to illustrate a nut in which the spring $c$ and the reduced ends of the roller $d$ are held in place by means of lugs $p$ forming parts of the perforated disks $q$. The perforated disks $q$ may be flat or they may as shown in Figs. 11 and 12 be made dished and of such a diameter as to just pass into a circular recess with undercut edges formed at each end of the nut. Then when the spring $c$ and roller $d$ have been inserted and pressure is applied to flatten the disks, they are expanded, or increased as to their external diameter, and forced into engagement with the undercut external edges of the recesses $r$. But if the disks are made flat the nut is provided as shown in dotted lines at $s$ in Fig. 10 with a thin annular projection which is pressed down over the edge of the disk by spinning or otherwise. The lugs $p$ then cover the upper and lower ends of the slot $b$ so that it is impossible for the spring and roller to be dislodged. The upper disk $q$ is further provided with a hole $i$ for the insertion of the pin $k$ (Fig. 5) to unlock the roller $d$ from the screw $e$ as before described. The spring $c$ is preferably provided with a lateral projection or foot $j$, as shown in Figs. 10 and 12A to prevent it from becoming displaced and it is suitably made to project under the roller $d$ toward the lower reduced end thereof.

Figs. 13, 14 and 14A show a construction similar to that shown in Fig. 9 except that the slot is so made as to contain two grooved rollers $d$ $d$ one of which serves to lock the nut against unscrewing while the other prevents the nut from being screwed up farther. As in the previous case the upper perforated disk $q$ is provided with a hole $i$ for the insertion of the pin $k$ (Fig. 5) and thus cause both rollers to be forced out of engagement with the thread of the screw and the outer sides of the slot. There may be two springs $c$ such as shown in Fig. 12A one at each end of the slot or the two springs may be made in one as shown in Fig. 14A.

What we claim as our invention and desire to secure by Letters Patent is:—

1. In a nut lock, the combination with a male screw, a nut provided with a longitudinal slot and a locking device in said slot, of a separate curved blade-spring provided with a lateral projection or foot to take under the locking device, the central portion of which engages the locking device and presses it into engagement with the thread of the said screw.

2. In a nut lock, the combination with a male screw, a nut provided with a longitudinal slot, a locking device in said slot and a curved blade spring mounted in said slot, of a disk in the face of the nut having a ledge or projection adapted to retain the locking device and the spring in position.

3. In a nut lock, the combination with a male screw, a nut provided with a longitudinal slot, a locking device in said slot and a curved blade spring mounted in said slot and provided with a lateral projection or foot to take under the locking device, of a disk in the face of the nut having a ledge or projection adapted to retain the locking device and the spring in position.

4. In a nut lock, the combination with a male screw, a nut provided with a longitudinal slot, a locking device in said slot and a curved blade spring mounted in said slot and provided with a lateral projection or foot to take under the locking device, of a perforated disk in the face of the nut having a ledge or projection adapted to retain the locking device and the spring in position.

5. In a nut lock, the combination with a male screw, a nut provided with a longitudinal slot, a locking device in said slot, said locking device having ends of smaller diameter than the central portion thereof, and a curved blade spring mounted in said slot and provided with a lateral projection or foot to take under the locking device, of a perforated disk in the face of the nut having a ledge or projection adapted to retain the locking device and the spring in position.

6. In a nut lock, the combination with a male screw, a nut provided with an annular recess at the end thereof, and a slot, a locking device in said slot, said locking device having ends of smaller diameter than the central portion thereof, and a curved blade spring mounted longitudinally within the slot and provided with a lateral projection or foot to take under the locking device, of a perforated disk fixed in the annular recess in the face of the nut and having a ledge or projection adapted to retain the locking device and the spring in position.

In testimony whereof we have signed our names to this specification in the presence of two subscribing witnesses.

WILLIAM REES BEVAN.
DANIEL THOMAS MORLEY.

Witnesses:
W. MORLEY,
H. D. JAMESON.